United States Patent
Sankar (10) Patent No.: US 12,409,417 B2
(45) Date of Patent: Sep. 9, 2025

(54) START-UP PROCEDURE FOR RAPID ATTAINMENT OF OPTIMAL STEADY-STATE PERFORMANCE IN MEMBRANE SEPARATION

(71) Applicant: SABIC Global Technologies B.V., Bergen op Zoom (NL)

(72) Inventor: Ashwin Ravi Sankar, Bangalore (IN)

(73) Assignee: SABIC Global Technologies B.V., Bergen op Zoom (NL)

( * ) Notice: Subject to any disclaimer, the term of this patent is extended or adjusted under 35 U.S.C. 154(b) by 625 days.

(21) Appl. No.: 17/762,637

(22) PCT Filed: Sep. 22, 2020

(86) PCT No.: PCT/IB2020/058855
§ 371 (c)(1),
(2) Date: Mar. 22, 2022

(87) PCT Pub. No.: WO2021/059137
PCT Pub. Date: Apr. 1, 2021

(65) Prior Publication Data
US 2022/0355250 A1   Nov. 10, 2022

Related U.S. Application Data (60) Provisional application No. 62/906,385, filed on Sep. 26, 2019.

(51) Int. Cl.
*B01D 61/36* (2006.01)
*B01D 63/06* (2006.01)

(52) U.S. Cl.
CPC ......... *B01D 61/362* (2013.01); *B01D 63/068* (2013.01); *B01D 2311/02* (2013.01);
(Continued)

(58) Field of Classification Search
CPC ............ B01D 2313/70; B01D 2311/02; B01D 231/02; B01D 2311/22
See application file for complete search history.

(56) References Cited

U.S. PATENT DOCUMENTS 2,985,588 A   5/1961   Binning et al.
5,236,474 A   8/1993   Schofield et al.
(Continued)

FOREIGN PATENT DOCUMENTS

CN   101020131 A   8/2007
EP   0220749 A2   5/1987
(Continued)

OTHER PUBLICATIONS

Kazemimoghadam, et. al, Modeling dehydration of organic compounds by use of polymer membranes with neural networks, Intnl Journal Research and Innovation, VI I6, 12-19 2017 (Year: 2017).*
(Continued)

*Primary Examiner* — Bradley R Spies
*Assistant Examiner* — Jeannie McDermott
(74) *Attorney, Agent, or Firm* — Norton Rose Fulbright US LLP (57) ABSTRACT

Systems and methods for separating a liquid mixture are disclosed. A membrane is first soaked by the liquid mixture via dynamic soaking to reach steady state. During the soaking process, the flow rate of the liquid mixture is increased at a flow rate ramp, the temperature is increased at a temperature ramp, and the pressure drop is increased at a pressure drop ramp. After the soaking process, the liquid mixture is separated by the membrane under optimized conditions to produce a permeate and a retentate.

14 Claims, 2 Drawing Sheets

(52) U.S. Cl.
CPC .... *B01D 2311/103* (2013.01); *B01D 2311/14* (2013.01); *B01D 2311/16* (2013.01); *B01D 2311/22* (2013.01); *B01D 2313/70* (2022.08); *B01D 2315/10* (2013.01)

(56) References Cited

U.S. PATENT DOCUMENTS

| | | | | |
|---|---|---|---|---|
| 5,556,539 | A | * | 9/1996 | Mita .................. B01D 61/362 |
| | | | | 210/103 |
| 5,559,254 | A | | 9/1996 | Krug et al. |
| 5,670,052 | A | | 9/1997 | Ho et al. |
| 6,692,786 | B1 | | 2/2004 | Denk et al. |
| 6,789,288 | B2 | | 9/2004 | Wijmans et al. |
| 9,765,024 | B2 | | 9/2017 | Terashi |
| 2004/0000521 | A1 | * | 1/2004 | Vane ................ B01D 61/3641 |
| | | | | 210/601 |
| 2004/0024260 | A1 | * | 2/2004 | Winkler ................ C07C 41/56 |
| | | | | 568/591 |
| 2004/0079228 | A1 | | 4/2004 | Wijmans et al. |
| 2007/0031954 | A1 | * | 2/2007 | Mairal .................... C12P 7/16 |
| | | | | 203/71 |
| 2013/0067803 | A1 | | 3/2013 | Kalakkunnath et al. |
| 2013/0075331 | A1 | | 3/2013 | Peiris et al. |
| 2015/0251140 | A1 | | 9/2015 | Ong et al. |
| 2017/0158635 | A1 | | 6/2017 | Terashi |
| 2017/0232396 | A1 | | 8/2017 | Dominiak et al. |

FOREIGN PATENT DOCUMENTS

| | | |
|---|---|---|
| EP | 532905 B1 | 8/1992 |
| JP | 2011177695 A | 9/2011 |
| JP | 2016203078 A | 12/2016 |

OTHER PUBLICATIONS

Rautenbach, Experimental Study of Dynamic Mass-Transfer Effects in Pervaporation, AIChE Journal, V44, No. 5, p. 1210-1215, 1998 (Year: 1998).*

Rautenbach (Year: 1998).*

"Membranes." Pervatech BV International, http://pervaporation-membranes.com/products/membranes/. Obtained Apr. 29, 2019, 2 pages.

Ahmad et al. "Hybrid Process (Pervaporation-Distillation): A Review." Int. J. Sci. Eng. Res., vol. 3, Issue 5 (2012) 1-5.

De Bruijn et al. "Influence of the support layer on the flux limitation in pervaporation." Journal of Membrane Science, vol. 223 (2003) 141-156.

Guo et al. "Pervaporation separation of ethylene glycol/water mixtures through surface crosslinked PVA membranes: Coupling effect and separation performance analysis." Journal of Membrane Science, vol. 289 (2007) 191-198.

Huang et al. "Separation of Ethylene Glycol-Water Mixtures Using Sulfonated Poly (ether ether ketone) Pervaporation Membranes: Membrane Relaxation and Separation Performance Analysis." Ind. Eng. Chem. Res., vol. 41 (2002) 2957-2965.

International Search Report and Written Opinion from PCT/IB2020/058855 dated Dec. 7, 2020, 16 pages.

Kittur et al. "Pervaporation Separation of Water-Isopropanol Mixtures Using ZSM-5 Zeolite Incorporated Poly(vinyl alcohol) Membranes." J. Applied Polymer Science, vol. 90, Issue 9 (2003) 2441-2448.

Louie et al. "Effects of surface coating process conditions on the water permeation and salt rejection properties of composite polyamide reverse osmosis membranes." J. Membrane Science, vol. 367, Issues 1-2 (2011) 249-255.

Marin et al. "Pervaporation process: membrane conditioning and experimental mass transfer analysis." Journal of Membrane Science, Elsevier Science Publishers B.V., Amsterdam, vol. 74, No. 1/05, Oct. 28, 1992, pp. 105-114.

Nik et al. "Separation of Ethylene Glycol/Water Mixtures using NaA Zeolite Membranes." Chem. Eng. Technol., vol. 29, No. 11 (2006): 1340-1346.

Rao et al. "Pervaporative Separation of Ethylene Glycol/Water Mixtures by Using Cross-linked Chitosan Membranes." Ind. Eng. Chem. Res., vol. 46 (2007) 2155-2163.

Ray et al. "Modeling adsorption of organic compounds on activated carbon using ETA indices." Chem. Eng. Sci. (2003), http://dx.doi.org/10.1016/j.ces.2013.09.018, 56 pages.

* cited by examiner

START-UP PROCEDURE FOR RAPID ATTAINMENT OF OPTIMAL STEADY-STATE PERFORMANCE IN MEMBRANE SEPARATION

CROSS REFERENCE TO RELATED APPLICATIONS

This application is a national phase application under 35 U.S.C. § 371 of International Application No. PCT/IB2020/058855 filed Sep. 22, 2020, which claims priority to U.S. Provisional Patent Application No. 62/906,385 filed Sep. 26, 2019. The entire contents of each of the above-referenced disclosures is specifically incorporated by reference herein without disclaimer.

FIELD OF INVENTION

The present invention generally relates to systems and methods for liquid mixture separation. More specifically, the present invention relates to membrane based systems and methods for liquid mixture separation that includes a start-up procedure to quickly attain steady state.

BACKGROUND OF THE INVENTION

Separation of liquid mixtures is an important process in the chemical industry for purifying products and/or recovering unreacted materials. Conventionally, distillation has been the most widely used technique for separating liquid components. However, several drawbacks, including high energy demand, large steam consumption, and low separation efficiency per pass, limit the economic viability of distillation in certain situations.

Separation of mixtures of water and organic compounds such as diols, alcohols, and polyols generally requires a large amount of energy. Because of formation of azeotropes in mixtures of organic compounds and water, the high heat capacity of water, and/or close boiling point range between water and the organic compounds, multi-stage distillation that involves a series of distillation columns with high reflux rate is often employed. Therefore, separation of such water-organic compound mixtures generally requires high capital expenditure and high operational costs. Membrane based techniques, including reverse osmosis, nanofiltration, ultra-filtration and pervaporation, have been explored for liquid mixture separation applications, but the implementation of these technologies on commercial scales is still low due to factors including low separation factor, low fluxes, lack of consistent performance, limited lifetime of membranes and loss of product to lower permeate purities. The flux and selectivity of the best membranes available are limited. Therefore, a large membrane area and/or operation in combination with another separation technique are required to separate compounds of liquid mixtures, which result in limited economic feasibility for membrane based processes.

Overall, while systems and methods for separating water and organic compounds exist, the need for improvements in this field persists in light of at least the aforementioned drawbacks for the conventional methods.

BRIEF SUMMARY OF THE INVENTION

A solution to at least some of the above-mentioned problems associated with the conventional methods for separating water and organic compounds has been discovered. The solution resides in a method of separating components of a liquid mixture that includes a startup step for fast attainment of steady state and a membrane separation step under optimal conditions. The start-up procedure is capable of shortening the time required to attain steady state compared to the conventional membrane based methods. Furthermore, the operating conditions for membrane separation can be optimized to obtain increased membrane lifetime, multi-fold increase in flux per unit area of the membrane, and increased permeate purity, compared to conventional methods. Moreover, the start-up and/or operating conditions of membrane separation of the disclosed method can be determined and adjusted using one or more algorithms including a machine learning algorithm, an artificial intelligence algorithm, and/or neural network modeling, resulting in quick and accurate adjustment for the conditions and/or parameters for the method. Therefore, the method of the present invention provides a technical solution to at least some of the problems associated with the currently available methods for separating water and organic liquid.

Embodiments of the invention include a method of separating components of a liquid mixture. The method comprises circulating the liquid mixture through one or more membranes of a membrane module. The method comprises increasing circulating flow rate through the membrane module at a flow rate ramp of 5 to 100 $L \cdot hr^{-1} \cdot min^{-1}$ for a specified period. The method comprises, after the specified period, flowing the liquid mixture through the membrane module under conditions such that the liquid mixture is separated into a permeate and a retentate.

Embodiments of the invention include a method of separating components of a liquid mixture. The method includes circulating the liquid mixture through one or more membrane modules. The method includes increasing circulating flow rate through the one or more membrane modules by 5 to 100 $L \cdot hr^{-1} \cdot min^{-1}$ per membrane module for a specified period. The method includes determining optimal conditions for separating the liquid mixture. The method includes, after the specified period, flowing the liquid mixture through the one or more membrane modules under the optimal conditions such that the liquid mixture is separated into a permeate and a retentate.

Embodiments of the invention include a method of separating components of a mixture of monoethylene glycol (MEG) and water. The method includes dynamically soaking one or more membranes of one or more membrane modules. The soaking comprises circulating the mixture through the one or more membrane modules. The soaking comprises increasing circulating flow rate through the one or more membrane modules by 5 to 100 $L \cdot hr^{-1} \cdot min^{-1}$ per membrane module for a specified period. The soaking further comprises adjusting conditions during the specified period based on measurements of temperature, pressure, and flow rates in the membrane during the specified period. The method includes determining, during the specified period, optimal conditions for separating the mixture. The method further includes, after the specified period, subjecting the membrane modules comprising the one or more membranes to a vacuum pressure and flowing the mixture through the one or more membrane modules under the optimal conditions such that the mixture is separated, by pervaporation and/or vapor permeation, into a first stream comprising primarily water and second stream comprising primarily MEG.

The following includes definitions of various terms and phrases used throughout this specification.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %", "vol. %" or "mol. %" refer to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, include any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

The term "primarily," as that term is used in the specification and/or claims, means greater than any of 50 wt. %, 50 mol. %, and 50 vol. %. For example, "primarily" may include 50.1 wt. % to 100 wt. % and all values and ranges there between, 50.1 mol. % to 100 mol. % and all values and ranges there between, or 50.1 vol. % to 100 vol. % and all values and ranges there between.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which.

DETAILED DESCRIPTION OF THE INVENTION

Currently, distillation is used for separating liquid mixtures. However, distillation of liquid mixtures in certain circumstances, especially organic liquid and water, generally consumes a large amount of energy and requires multiple distillation columns in series due to the formation azeotropes between the components of the liquid mixture. Thus, the operational costs can be high when distillation is used for separating liquid mixtures of organic liquid and water. Membrane based technologies, including reverse osmosis, ultrafiltration, and/or nanofiltration, are also used for separating organic liquid and water. However, using these membrane based technologies in an industrial scale is challenging because of the limited separation factors (SF), prolonged start up procedure, and requirement of large membrane surfaces. The present invention provides a solution to these problems. The solution is premised on a method of separating components of a liquid mixture that includes a startup procedure for quick attainment of steady state. This can be beneficial for shortening the required time of the overall separation process. Furthermore, the disclosed method can further use a machine learning algorithm, an artificial intelligence, and/or neural network modeling to determine and adjust the startup conditions and operating conditions for the membrane based separation process, which can lead to improvement in separation efficiency, membrane lifetime, and purity of the products. These and other non-limiting aspects of the present invention are discussed in further detail in the following sections.

A. System for Separating Components of a Liquid Mixture

Figure 1:
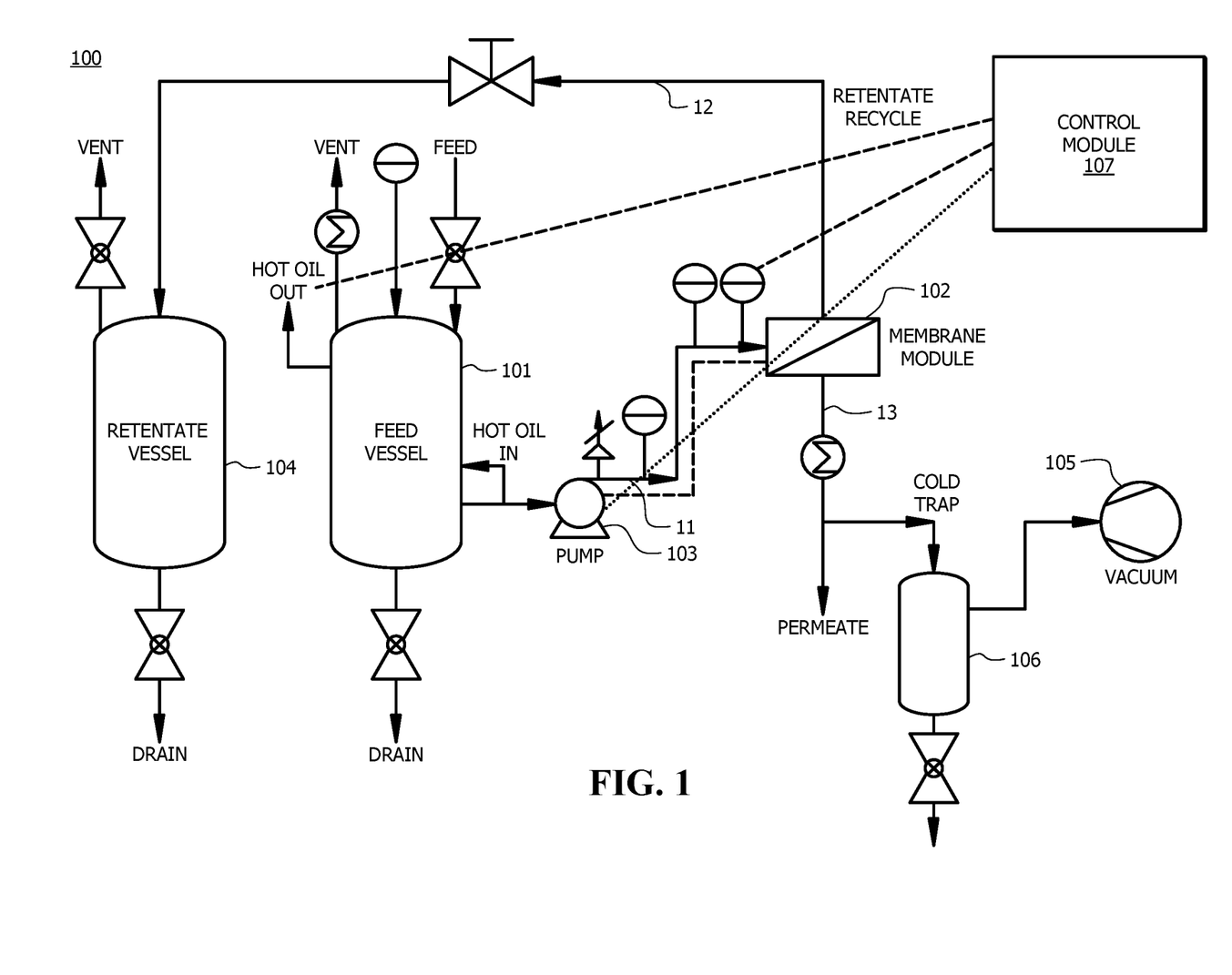
FIG. 1 shows a schematic diagram of a system for separating components of a liquid mixture, according to embodiments of the invention.

In embodiments of the invention, the membrane based separation system for separating a liquid mixture can include one or more membrane modules, a feed vessel, a retentate vessel, and a vacuum pump. With reference to FIG. 1, a schematic diagram is shown for system 100 that is capable of separating a liquid mixture with shortened start-up procedure and improved separation performance compared to conventional membrane based separation methods.

According to embodiments of the invention, system 100 comprises feed vessel 101. Feed vessel 101 may be configured to store a liquid mixture. In embodiments of the invention, feed vessel 101 may comprise a hot oil unit configured to heat the liquid mixture therein to a target temperature. The liquid mixture may comprise 2 to 90 wt. % diol and 10 to 98 wt. % water. In embodiments of the invention, the liquid mixture includes (1) a mixture of bisphenol A (BPA), Phenol, and/or water, (2) a mixture of tetrahydrofuran, methanol, and water, (3) a mixture of acetic acid, HCl, and water, (4) a mixture of toluene and water, (5) a mixture of dimethyl carbonate and methanol, (6) a mixture of methanol, toluene, and water, (7) a mixture of alcohol and water, (8) a mixture of ethylene glycol and water, or combinations thereof.

According to embodiments of the invention, an outlet of feed vessel 101 may be in fluid communication with membrane module 102 such that feed stream 11 comprising the liquid mixture flows from feed vessel 101 to membrane module 102. In embodiments of the invention, feed pump 103 may be installed between feed vessel 101 and membrane module 102 configured to pump feed stream 11 from feed vessel 101 to membrane module 102. Feed pump 103 may include a dynamic pump or a positive displacement pump. Non-limiting examples for the dynamic pump may include a centrifugal pump, a submersible pump, a hydrant booster pump, and combinations thereof. Non-limiting examples for the positive displacement pump may include a gear pump, a diaphragm pump, a peristaltic pump, a piston pump, a lobe pump, a pump produced by Julabo™ (U.S.A.), and combinations thereof.

In embodiments of the invention, membrane module 102 is configured to separate feed stream 11 to form retentate stream 12 comprising a retentate and permeate stream 13 comprising a permeate. According to embodiments of the invention, membrane module 102 may include one or more membranes contained in a frame. Membrane module 102 may further include a membrane support adapted to support each membrane in membrane module 102. The support may be disposed at a side of a membrane that is distal from feed stream 11. Non-limiting examples of the membrane support may include polyvinyl alcohol, polysulfone, silica, polyimide, zeolite, zirconia, silicalite-1, ZSM-5, ceramic, and combinations thereof.

According to embodiments of the invention, the membranes of membrane module 102 may include one or more organic polymeric membranes, one or more organic ceramic membranes, one or more organic zeolite membranes, one or more organic hybrid membranes, or combinations thereof. Non-limiting examples of organic polymeric membranes include polyvinyl alcohol (PVA) membranes, chitosan membranes, polyamides membranes, polyimides membranes, polyacrylonitrile (PAN) membranes, polyacrylic acid membranes, cellulose acetate membranes, polydimethylsiloxane (PDMS) membranes, poly-block-ether-amides membranes, polyurethanes membranes, and combinations thereof. Non-limiting examples of ceramic membranes may include silica membranes, alumina membranes, zirconia membranes, and combinations thereof. Non-limiting examples of zeolite membranes may include hydrophilic membranes (e.g., zeolite NaA, Y), and hydrophobic membranes (e.g., silicalite-1, ZSM-5), and combinations thereof. Non-limiting examples of hydride membranes may include silica in polymeric matrix type of membranes (e.g., Hybrid Silica Hybsi® from ECN (Netherlands)), polymeric mixed matrix membranes (e.g., PDMS and polyetherimide membranes, and PVA and chistosan membranes), and combinations thereof. In embodiments of the invention, the membranes may be in the form of membrane tubes.

According to embodiments of the invention, an outlet of membrane module 102 is in fluid communication with an inlet of retentate vessel 104 such that retentate stream 12 flows from membrane module 102 to retentate vessel 104. In embodiments of the invention, an outlet of membrane module 102 is in fluid communication with vacuum pump 105. Vacuum pump 105 is configured to apply vacuum downstream of the membranes of membrane module 102 during separation of feed stream 11. In embodiments of the invention, system 100 includes cold trap 106 installed upstream of vacuum pump 105 and downstream of membrane module 102. Cold trap 106 may be in fluid communication with both vacuum pump 105 and membrane module 102, and configured to condense permeate stream 13.

According to embodiments of the invention, system 100 includes control module 107 comprising a feed forward loop configured to control the hot oil unit of feed vessel 101 for adjusting the temperature and/or temperature ramp of liquid mixture in feed vessel 101. Control module 107 may be configured to control feed pump 103 for adjusting the flow rate and/or flow rate ramp of feed stream 11. Control module 107 may be further configured to control pressure head generated by feed pump 103 and/or a recirculating flow booster. The pressure ramp can be a function of time. For instance, the pressure ramp can be a step change of pressure or rate of increase of pressure with time (i.e., exemplary units of pressure ramp may include bar/hour, bar/minute, bar/s, etc.). In embodiments of the invention, control module 107 is configured to take real time live measurements of one or more parameters in membrane module 102 and adjust parameters including temperature ramp, flow rate ramp, or pressure ramp rates based on the real time live measurements. Further, algorithms including statistical tools and artificial intelligence (AI) may be incorporated in control module 107. The algorithms may be configured to use the real time data comprising the real time live measurements to predict the future data including the parameters in membrane module 102 and adjust the ramp rates of the parameters to turn the overall control system from feedback to feedforward control loops. In embodiments of the invention, control module 107 includes non-transitory storage medium configured to store one or more algorithms for pre-setting and/or optimizing a start-up procedure and/or operating conditions of system 100. According to embodiments of the invention, the one or more algorithms of control module 107 is adapted to derive preliminary empirical equations that can be used in training test samples to simulate the membrane separation process at membrane module 102 and obtain optimized process conditions and ramp-up rates for start-up procedures of system 100. The one or more algorithms may include a machine learning algorithm, an artificial intelligence algorithm, an advanced statistical tools based algorithm, a design of experiment algorithm (e.g., Box-Behnken Design), a hybrid pore-diffusion model based algorithm, a neural network based algorithm, a big data analytic algorithm, stochastic algorithm, spatial correlations based algorithm, best-fit (f-test, p-value based) algorithm, regression based algorithms (e.g., ordinal logistic, mixed-effects, random forest), or combinations thereof. In embodiments of the invention, the machine learning algorithm may include a supervised learning algorithm, an unsupervised learning algorithm, a reinforcement learning algorithm, a clustering technique based learning algorithm, or combinations thereof. In embodiments of the invention, the one or more algorithms are executed using input parameters of system 100 including but not limited to real-time monitored data of temperature, pressure head, vacuum pressure, permeate flow rate, retentate flow rate, temperature drop across the membrane module, feed concentration, retentate concentration, permeate concentration (all concentrations in weight basis %), thickness of scaling on outer/inner deposits, condenser/cooling water inlet and outlet temperatures, cooling water flow rate, or combinations thereof. In embodiments of the invention, real time data of the input parameters of system 100 are processed and analyzed by big data analytic algorithms of control module 107. In embodiments of the invention, the one or more algorithms are capable of utilizing real time data of real time live measurement to optimize operating parameters in real time such that the temperature, pressure and/or flowrate ramp rates of membrane module 102 can reach maximize separation efficiency. The control loop can be transformed to feedforward control from feedback mode wherein the optimized parameters can be predicted ahead of time and fitted with real time measurements in order to auto-correct the model coefficients/constants in real time. The final goal of the algorithms can include making the feedforward control system (for system 100) reach optimal steady state in a shorter time compared to conventional systems, enabling dynamic soaking (where membrane is treated with process fluid/feed itself with optimal process ramp rates including temperature ramp, pressure ramp, flow rate ramp, etc.) and optimizing the separation efficiency via increasing the flux and permeate purity in high magnitudes (e.g., ~7 to 10 times the flux, with >99% permeate purity) compared to conventional processes that utilize feedback control loops.

In embodiments of the invention, a hybrid pore diffusion model is used for building a model for membrane based separation using system 100. The hybrid pore diffusion model can be derived by using both solution-diffusion model and the pore flow model to obtain an equation for permeate flux. According to embodiments of the invention, the hybrid pore diffusion model is based on pre-assumption that components could be in liquid phase or vapor phase and the state of the components in the membrane is determined by assuming an imaginary phase for the components. In the hybrid pore diffusion model, according to embodiments of the invention, when the pressure of the imaginary phase exceeds the saturation pressure of the diffusing components, it is in liquid state. The imaginary phase can be in vapor state when the imaginary phase has a pressure less than the saturation pressure. The flux and concentration in the membrane phase can be considered to follow the solution-diffusion model when it was liquid. In embodiments of the invention, in the membrane phase corresponding to the liquid section, the diffusivity is independent from concentration, whereas, in the vapor section, the diffusivity can be considered to be increasing exponentially with concentration. Total flux of a membrane based on the hybrid model can be expressed by the following equation.

$$J = \frac{A_{mix}}{\delta_a}(P_1 - P_*) + \frac{B_i}{\delta_b}\left(P_{i,*}^2 - P_{i,2}^2\right) + \frac{B_j}{\delta_b}\left(P_{j,*}^2 - P_{j,2}^2\right)$$

Where J is permeation flux ($kmol \cdot m^{-2} \cdot s^{-1}$ or $kg \cdot m^{-2} \cdot h^{-1}$), $A_{mix}$ is liquid phase transport parameter of mixed feed ($kmol \cdot m^{-1} \cdot s^{-1} \cdot mmHg^{-1}$), $\delta_a$ is the distance (m) from feed-membrane interface to liquid section, $\delta_b$ is the distance (m) from feed-membrane interface to vapor section, $P_1$ is pressure of feed stream, P* is saturation pressure at vapor-liquid interface, $B_j$ is vapor phase transport parameter ($kmol \cdot m^{-1} \cdot s^{-1} \cdot mmHg^{-2}$) for component i (e.g., ethanol), $P_{i,*}$ is saturation pressure of component i at vapor-liquid interface, $P_{i,2}$ is partial pressure of component j (e.g., water) in the permeate, $B_j$ is vapor phase transport parameter ($kmol \cdot m^{-1} \cdot s^{-1} \cdot mmHg^{-1}$) for component j, $P_j$* is saturation pressure of component j at vapor-liquid interface, and $P_{j,2}$ is partial pressure for component j in the permeate.

B. Method for Separating Components of a Liquid Mixture

Methods of separating components of a liquid mixture using a membrane based separation system have been discovered. The methods may include a quick start-up procedure for reaching steady state, thereby shortening the operation process compared to the conventional methods. The methods may include the liquid mixture being separated under optimized conditions that are provided and being adjusted by the control module using various algorithms, resulting in the improved separation performance and prolonged membrane lifetime.

Figure 2:
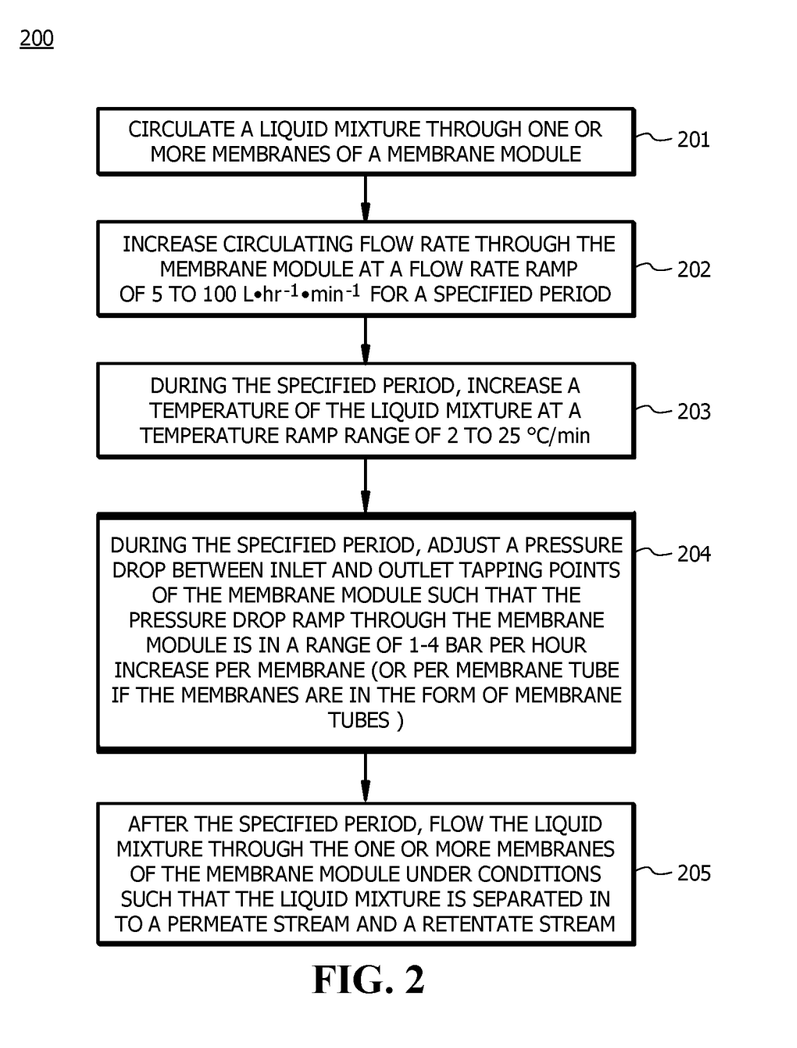
FIG. 2 shows a schematic flowchart for a method of separating components of a liquid mixture, according to embodiments of the invention.

As shown in FIG. 2, embodiments of the invention include method 200 for separating components of a liquid mixture. Method 200 may be implemented by system 100, as shown in FIG. 1 and described above. According to embodiments of the invention, as shown in block 201, method 200 comprises circulating the liquid mixture through the one or more membranes of membrane module 102. The circulating at block 201 may be configured to dynamically soak the one or more membranes of membrane module 102 in the liquid mixture.

According to embodiments of the invention, as shown in block 202, method 200 comprises increasing circulating flow rate through the one or more membranes at a flow rate ramp for a specified period. In embodiments of the invention, the membranes in membrane module 102 are in form of membrane tubes. An initial flow rate of the liquid mixture at a beginning of the specified period may be in a range of 10 to 200 $L \cdot hr^{-1}$ per membrane tube and all ranges and values there between including ranges of 10 to 20 $L \cdot hr^{-1}$, 20 to 40 $L \cdot hr^{-1}$, 40 to 60 $L \cdot hr^{-1}$, 60 to 80 $L \cdot hr^{-1}$, 80 to 100 $L \cdot hr^{-1}$, 100 to 120 $L \cdot hr^{-1}$, 120 to 140 $L \cdot hr^{-1}$, 140 to 160 $L \cdot hr^{-1}$, 160 to 180 $L \cdot hr^{-1}$, and 180 to 200 $L \cdot hr^{-1}$. The flow rate ramp during the specified period at block 202 may be in a range of 5 to 100 $L \cdot hr^{-1} \cdot min^{-1}$ and all ranges and values there between including ranges of 5 to 10 $L \cdot hr^{-1} \cdot min^{-1}$, 10 to 15 $L \cdot hr^{-1} \cdot min^{-1}$, 15 to 20 $L \cdot hr^{-1} \cdot min^{-1}$, 20 to 25 $L \cdot hr^{-1} \cdot min^{-1}$, 25 to 30 $L \cdot hr^{-1} \cdot min^{-1}$, 30 to 35 $L \cdot hr^{-1} \cdot min^{-1}$, 35 to 40 $L \cdot hr^{-1} \cdot min^{-1}$, 40 to 45 $L \cdot hr^{-1} \cdot min^{-1}$, 45 to 50 $L \cdot hr^{-1} \cdot min^{-1}$, 50 to 55 $L \cdot hr^{-1} \cdot min^{-1}$, 55 to 60 $L \cdot hr^{-1} \cdot min^{-1}$, 60 to 65 $L \cdot hr^{-1} \cdot min^{-1}$, 65 to 70 $L \cdot hr^{-1} \cdot min^{-1}$, 70 to 75 $L \cdot hr^{-1} \cdot min^{-1}$, 75 to 80 $L \cdot hr^{-1} \cdot min^{-1}$, 80 to 85 $L \cdot hr^{-1} \cdot min^{-1}$, 85 to 90 $L \cdot hr^{-1} \cdot min^{-1}$, 90 to 95 $L \cdot hr^{-1} \cdot min^{-1}$, and 95 to 100 $L \cdot hr^{-1} \cdot min^{-1}$. In embodiments of the invention, the flow rate ramp is determined and/or adjusted by the one or more algorithms of control module 107.

The specified period (soaking time) may be 1 to 5 hours. Once steady state is reached after the specified period, the same final set-point flow rate can be maintained at 100 to 200 $L \cdot hr^{-1}$ per membrane (tube). In embodiments of the invention, the range of the specified period can be determined and/or adjusted by control module 107. According to embodiments of the invention, as shown in block 203, method 200 further comprises, during the specified period, increasing a temperature of the liquid mixture at a temperature ramp range of 2 to 25° C./min and all ranges and values there between including ranges of 2 to 4° C./min, 4 to 6° C./min, 6 to 8° C./min, 8 to 10° C./min, 10 to 12° C./min, 12 to 14° C./min, 14 to 16° C./min, 16 to 18° C./min, 18 to 20° C./min, 20 to 22° C./min, and 22 to 25° C./min. An initial temperature of the liquid mixture at a beginning of the specified period may be in a range of 0 to 40° C. and all ranges and values there between including ranges of 0 to 4° C., 4 to 8° C., 8 to 12° C., 12 to 16° C., 16 to 20° C., 20 to 24° C., 24 to 28° C., 28 to 32° C., 32 to 36° C., and 36 to 40° C. In embodiments of the invention, during the specified period, the temperature ramp range is determined and/or adjusted by the one or more algorithms of control module 107. In embodiments of the invention, a final temperature of the liquid mixture at steady state may be in a range of 100 to 250° C. and all ranges and values there between including ranges of 100 to 110° C., 110 to 120° C., 120 to 130° C., 130 to 140° C., 140 to 150° C., 150 to 160° C., 160 to 170° C., 170 to 180° C., 180 to 190° C., 190 to 200° C., 200 to 210° C., 210 to 220° C., 220 to 230° C., 230 to 240° C., and 240 to 250° C.

According to embodiments of the invention, as shown in block 204, method 200 further comprises, during the specified period, adjusting a pressure drop between inlet and outlet tapping points of membrane module 102 such that the pressure drop ramp rate through one or more membranes of membrane module 102 is in a range of 1 to 4 bar/hr increase per membrane (tube) and all ranges and values there between including ranges of 1 to 1.2 bar/hr, 1.2 to 1.4 bar/hr, 1.4 to 1.6 bar/hr, 1.6 to 1.8 bar/hr, 1.8 to 2 bar/hr, 2 to 2.2 bar/hr, 2.2 to 2.4 bar/hr, 2.4 to 2.6 bar/hr, 2.6 to 2.8 bar/hr, 2.8 to 3 bar/hr, 3 to 3.2 bar/hr, 3.2 to 3.4 bar/hr, 3.4 to 3.6 bar/hr, 3.6 to 3.8 bar/hr, and 3.8 to 4 bar/hr. In embodiments of the invention, a steady state is reached at one or more membranes of membrane module 102 during and/or at the end of the specified period. In embodiments of the invention, the steady state is a state at which all state variables (e.g., flow rate, temperature, and pressure across membrane module 102) of system 100 are substantially constant or constant and continue to be substantially constant or constant unless some external perturbation to system 100 occurs. In embodiments of the invention, steps of block 201 to block 204 are capable of shortening duration required for reaching steady state at one or more membranes of membrane module 102 compared to soaking the one or more membranes in a non-circulating liquid mixture.

According to embodiments of the invention, as shown in block 205, method 200 comprises, after the specified period, flowing feed stream 11 comprising the liquid mixture through the one or more membranes of membrane module 102 under conditions such that the liquid mixture is separated into permeate stream 13 comprising a permeate and retentate stream 12 comprising a retentate. In embodiments of the invention, the flowing at block 205 may be initiated by applying vacuum by vacuum pump 105 to the one or more membranes of membrane module 102. According to embodiments of the invention, the conditions at block 205 are determined and/or optimized by the one or more algorithms of control module 107.

In embodiments of the invention, the conditions at block 205 include a temperature of the liquid mixture in a range of 100 to 200° C. and all ranges and values there between including ranges of 100 to 105° C., 105 to 110° C., 110 to 115° C., 115 to 120° C., 120 to 125° C., 125 to 130° C., 130 to 135° C., 135 to 140° C., 140 to 145° C., 145 to 150° C., 150 to 155° C., 155 to 160° C., 160 to 165° C., 165 to 170° C., 170 to 175° C., 175 to 180° C., 180 to 185° C., 185 to 190° C., 190 to 195° C., and 195 to 200° C. The conditions at block 205 may include an operating pressure of 2 to 8 bar and all ranges and values there between including ranges of 2 to 3 bar, 3 to 4 bar, 4 to 5 bar, 5 to 6 bar, 6 to 7 bar, and 7 to 8 bar. In embodiments of the invention, the conditions at block 205 include a flow rate of feed stream 11 in a range of 80 to 1000 L/hr per membrane module and all ranges and values there between including 80 to 100 L/hr, 100 to 150 L/hr, 150 to 200 L/hr, 200 to 250 L/hr, 250 to 300 L/hr, 300 to 350 L/hr, 350 to 400 L/hr, 400 to 450 L/hr, 450 to 500 L/hr, 500 to 550 L/hr, 550 to 600 L/hr, 600 to 650 L/hr, 650 to 700 L/hr, 700 to 750 L/hr, 750 to 800 L/hr, 800 to 850 L/hr, 850 to 900 L/hr, 900 to 950 L/hr, and 950 to 1000 L/hr. In embodiments of the invention, at block 205, the conditions includes applying a vacuum to the one or more membranes of membrane module 102 with a vacuum pressure of 20 to 200 mbar and all ranges and values there between including ranges of 20 to 40 mbar, 40 to 60 mbar, 60 to 80 mbar, 80 to 100 mbar, 100 to 120 mbar, 120 to 140 mbar, 140 to 160 mbar, 160 to 180 mbar, and 180 to 200 mbar. Starting pressure of membrane module 102 before applying vacuum may be about 1 bar. A pressure ramp (decreasing ramp) of membrane module 102 may be in a range of 20 to 100 mbar per minute and all ranges and values there between including ranges of 20 to 30 mbar/min, 30 to 40 mbar/min, 40 to 50 mbar/min, 50 to 60 mbar/min, 60 to 70 mbar/min, 70 to 80 mbar/min, 80 to 90 mbar/min, and 90 to 100 mbar/min. In embodiments of the invention, method 200 is used for separating water and monoethylene glycol and permeate stream 13 produced by method 200 comprises at least 95% water.

According to embodiments of the invention, method 200 can be used to replace one or more steps in diol manufacturing plant(s), including diol dehydration-$CO_2$ vent water purification, condensate water purification, overhead ethylene glycol separation, water separation from reactor effluent, aldehydes and acids separation section, de-ionizing unit in cycle water stream. According to embodiments of the invention, method 200 is capable of producing purified concentrated diol/polyols and improving ultraviolet transmittance of water. In embodiments of the invention, the water purified using method 200 has an ultraviolet transmittance greater than 90% at 220 nm, 250 nm, 250 nm, 275 nm, and 350 nm. In embodiments of the invention, method 200 is capable of reducing total dissolved solids (TDS) in water, improving pH value of water, reducing (permeate) water conductivity and aldehyde contents in water. The permeate water produced by method 200 may be utilized as cycle water in glycol plants or a treated process water in other chemical plants and/or manufacturing units.

Although embodiments of the present invention have been described with reference to blocks of FIG. 2, it should be appreciated that operation of the present invention is not limited to the particular blocks and/or the particular order of the blocks illustrated in FIG. 2. Accordingly, embodiments of the invention may provide functionality as described herein using various blocks in a sequence different than that of FIG. 2.

The systems and processes described herein can also include various equipment that is not shown and is known to one of skill in the art of chemical processing. For example, some controllers, piping, computers, valves, pumps, heaters, thermocouples, pressure indicators, mixers, heat exchangers, and the like may not be shown.

As part of the disclosure of the present invention, specific examples are included below. The examples are for illustrative purposes only and are not intended to limit the invention. Those of ordinary skill in the art will readily recognize parameters that can be changed or modified to yield essentially the same results.

Example 1

Pervaporation Experiment in a Pilot Scale System

A liquid mixture of monoethylene glycol and water was separated using a Pervatech® membrane at a pilot plant. Each membrane module in the pilot plant included 10 membrane tubes. Each membrane tube had an outer diameter of 10.04 mm and inner diameter of 6.5 mm. The wall thickness for each membrane tube was 1.89 mm. The contacting area of each membrane tube was about 46.9 $cm^2$. The feed concentration of monoethylene glycol was in a range of 2 to 80 wt. %. The flowrate was in a range of 100 to 1000 L/hr. The feed temperature was in a range of 90 to 140° C. The feed pressure was set in a range of 1-5 bar. The vacuum on the permeate was in a range 50 to 70 mbar. Cooling water used for recovering the permeate was at about 5° C. Simulations on the separation process were also performed in Aspen (versions 9 and 10), ACM-Aspen Custom Modeler. Statistical modeling was performed in GAMS and JMP.

The experimental results are shown in Tables 1 and 2. Table 1 shows the experimental results of membrane separation without rapid startup and non-dynamic soaking. Table 2 shows the experimental results of membrane separation with rapid startup and dynamic soaking. Table 3 shows the simulation results of rapid start-up and dynamic soaking.

TABLE 1

Pilot plant Trials
Without Rapid-startup & soaking

| | | | | | | | | |
|---|---|---|---|---|---|---|---|---|
| Flow rate (Liter per hour) | 150 | | 275 | | 477 | | 753 | |
| Time of Run (hours) | 5 | | 7 | | 17 | | 36 | |
| Steady state attainment (Mins) | Did not reach | | 300 | | 390 | | 468 | |
| Temperature (° C.) | 92 | ° C. | 115 | ° C. | 129 | ° C. | 137 | ° C. |
| Pressure (bar) | 3 | bar | 4 | bar | 5 | bar | 6 | bar |
| Permeate volume (mL) | 548.00 | mL | 1672.33 | mL | 2048.11 | mL | 1209.18 | mL |
| Permeate weight (gm) | 542.52 | gm | 1655.78 | gm | 2027.83 | gm | 1199.97 | gm |
| Permeate density (g/mL) | 0.99 | g/mL | 0.99 | g/mL | 0.99 | g/mL | 0.99 | g/mL |
| Permeate MEG % by GC (wt %) | 1.07 | wt % | 1.86 | wt % | 2.26 | wt % | 5.12 | wt % |
| Water purity (Permeate side wt %) | 98.93 | wt % | 98.14 | wt % | 97.74 | wt % | 94.88 | wt % |
| Membrane flux [Kg/m2 · hr] | 23.59 | kg/m2 · hr | 51.42 | kg/m2 · hr | 25.93 | kg/m2 · hr | 7.25 | kg/m2 · hr |
| Feed MEG % by GC (wt %) | 15.70 | wt % | 32.62 | wt % | 56.31 | wt % | 73.20 | wt % |
| Separation Factor | 17.21933 | | 25.54383 | | 55.74005 | | 50.61521 | |
| Pervaporation Separation Index (PSI) [Kg/m2 · hr] | 382.5788 | kg/m2 · hr | 1262.083 | kg/m2 · hr | 1419.483 | kg/m2 · hr | 359.5207 | kg/m2 · hr |

TABLE 2

Pilot plant Trials
With Rapid Start-up & Dynamic Soaking

| | | | | | | | | |
|---|---|---|---|---|---|---|---|---|
| Flow rate (Liter per hour) | 150 | | 275 | | 477 | | 753 | |
| Time of Run (hours) | 2.3 | | 5.4 | | 6.7 | | 4.4 | |
| Steady state attainment (Mins) | 7 | | 12 | | 13 | | 16.5 | |
| Temperature (° C.) | 92 | ° C. | 115 | ° C. | 129 | ° C. | 137 | ° C. |
| Pressure (bar) | 3 | bar | 4 | bar | 5 | bar | 6 | bar |
| Permeate volume (mL) | 548.00 | mL | 1672.33 | mL | 2048.11 | mL | 1209.18 | mL |
| Permeate weight (gm) | 542.52 | gm | 1655.78 | gm | 2027.83 | gm | 1199.97 | gm |
| Permeate density (g/mL) | 0.99 | g/mL | 0.99 | g/mL | 0.99 | g/mL | 0.99 | g/mL |
| Permeate MEG % by GC (wt %) | 1.07 | wt % | 1.86 | wt % | 2.26 | wt % | 5.12 | wt % |
| Water purity (Permeate side wt %) | 98.93 | wt % | 98.14 | wt % | 97.74 | wt % | 94.88 | wt % |
| Membrane flux [Kg/m2 · hr] | 51.28 | kg/m2 · hr | 66.66 | kg/m2 · hr | 65.80 | kg/m2 · hr | 59.29 | kg/m2 · hr |
| Feed MEG % by GC (wt %) | 15.70 | wt % | 32.62 | wt % | 56.31 | wt % | 73.20 | wt % |
| Separation Factor | 17.21933 | | 25.54383 | | 55.74005 | | 50.61521 | |
| Pervaporation Separation Index (PSI) [Kg/m2 · hr] | 831.693 | kg/m2 · hr | 1636.033 | kg/m2 · hr | 3601.672 | kg/m2 · hr | 2941.533 | kg/m2 · hr |

TABLE 3

Simulation Runs
With Rapid Start-up & Dynamic Soaking

| | | | | | | | | |
|---|---|---|---|---|---|---|---|---|
| Flow rate (Liter per hour) | 175 | | 300 | | 475 | | 750 | |
| Time of Run (hours) | 2.5 | | 5.5 | | 7 | | 5 | |
| Steady state attainment | 6.5 | | 10.2 | | 11.3 | | 12.8 | |
| Temperature (° C.) | 90 | ° C. | 115 | ° C. | 130 | ° C. | 140 | ° C. |
| Pressure | 3 | bar | 4 | bar | 5 | bar | 6 | bar |
| Permeate volume | 548.00 | mL | 1672.33 | mL | 2091.06 | mL | 1314.18 | mL |
| Permeate weight | 542.52 | gm | 1655.78 | gm | 2070.36 | gm | 1304.17 | gm |
| Permeate density | 0.99 | g/mL | 0.99 | g/mL | 0.99 | g/mL | 0.99 | g/mL |
| Permeate MEG % by simulation [Aspen Custom Modeling] | 1 | wt % | 1.9 | wt % | 2.1 | wt % | 5.3 | wt % |

TABLE 3-continued

Simulation Runs
With Rapid Start-up & Dynamic Soaking

| | | | | | | | | | |
|---|---|---|---|---|---|---|---|---|---|
| Water purity (Permeate side wt %) | 99.00 | wt % | 98.10 | wt % | 97.90 | wt % | 94.70 | wt % | |
| Membrane flux | 47.18 | kg/m2 · hr | 65.45 | kg/m2 · hr | 64.30 | kg/m2 · hr | 56.70 | kg/m2 · hr | |
| Feed MEG % (Basis) [wt %] | 15.00 | wt % | 32.00 | wt % | 55.00 | wt % | 75.00 | wt % | |
| Separation Factor | 17.47059 | | 24.29721 | | 56.97884 | | 53.60377 | | |
| Pervaporation Separation Index (PSI) [Kg/m2 · hr] | 777.0107 | kg/m2 · hr | 1524.701 | kg/m2 · hr | 3599.266 | kg/m2 · hr | 2982.788 | kg/m2 · hr | |

TABLE 4

(With Rapid Start-up & Dynamic Soaking) Pilot plant Trial Experiments

| | | | | | | | | |
|---|---|---|---|---|---|---|---|---|
| Flow rate (Liter per hour) | 250 | | 475 | | 700 | | 1250 | |
| Temperature (° C.) | 110 | ° C. | 125 | ° C. | 145 | ° C. | 165 | ° C. |
| Pressure (bar) | 3 | bar | 4 | bar | 4.5 | bar | 5 | bar |
| Permeate volume (mL) | 101087.00 | mL | 198673.00 | mL | 285890.00 | mL | 385890.00 | mL |
| Permeate weight (gm) | 100076.13 | gm | 196705.94 | gm | 283059.41 | gm | 382949.90 | gm |
| Permeate density (g/mL) | 0.99 | g/mL | 0.99 | g/mL | 0.99 | g/mL | 0.99 | g/mL |
| Permeate MEG % by GC (wt %) | 0.89 | wt % | 0.75 | wt % | 0.24 | wt % | 0.1 | wt % |
| Water purity (Permeate side wt %) | 99.10 | wt % | 99.15 | wt % | 99.05 | wt % | 99.25 | wt % |
| Membrane flux [Kg/m2 · hr] | 106.59 | kg/m2 · hr | 119.72 | kg/m2 · hr | 134.00 | kg/m2 · hr | 153.92 | kg/m2 · hr |
| Feed MEG% by GC (wt %) | 22.40 | wt % | 23.50 | wt % | 27.40 | wt % | 24.20 | wt % |
| Separation Factor | 31.78 | | 35.83 | | 39.35 | | 42.25 | |
| Pervaporation Separation Index (PSI) [Kg/m2 · hr] | 3281.44 | kg/m2 · hr | 4170.29 | kg/m2 · hr | 5138.78 | kg/m2 · hr | 6349.03 | kg/m2 · hr |
| Time of Run (Hours) | 200 | | 350 | | 450 | | 530 | |

TABLE 5

Additional Piloting Trials

| | | | | | | | | |
|---|---|---|---|---|---|---|---|---|
| Flow rate (Liter per hour) | 250 | | 475 | | 700 | | 1250 | |
| Temperature (° C.) | 110 | ° C. | 125 | ° C. | 145 | ° C. | 165 | ° C. |
| Pressure | 3 | bar | 4 | bar | 4.5 | bar | 5 | bar |
| Permeate volume | 111097.00 | mL | 200011.00 | mL | 289598.00 | mL | 399369.00 | mL |
| Permeate weight | 109986.03 | gm | 198030.69 | gm | 286730.69 | gm | 396326.21 | gm |
| Permeate density | 0.99 | g/mL | 0.99 | g/mL | 0.99 | g/mL | 0.99 | g/mL |
| Permeate MEG % | 0.92 | wt % | 0.8 | wt % | 0.3 | wt % | 0.15 | wt % |
| Water purity (Permeate side wt %) | 99.23 | wt % | 99.25 | wt % | 99.08 | wt % | 98.95 | wt % |
| Membrane flux [Kg/m2 · hr] | 117.15 | kg/m2 · hr | 120.53 | kg/m2 · hr | 135.73 | kg/m2 · hr | 159.30 | kg/m2 · hr |
| Feed MEG % (Basis) [wt %] | 22.40 | wt % | 23.50 | wt % | 27.40 | wt % | 24.20 | wt % |
| Separation Factor | 37.20 | | 40.65 | | 40.65 | | 30.09 | |
| Pervaporation Separation Index (PSI) [Kg/m2 · hr] | 4240.73 | kg/m2 · hr | 4779.17 | kg/m2 · hr | 5381.26 | kg/m2 · hr | 4633.39 | kg/m2 · hr |
| Time of Run (Hours) | 200 | | 350 | | 450 | | 530 | |

In the context of the present invention, at least the following 15 embodiments are described. Embodiment 1 is a method of separating components of a liquid mixture. The method includes circulating the liquid mixture through one or more membranes of a membrane module. The method further includes increasing circulating flow rate through the membrane module at a flow rate ramp range of 5 to 100 L·hr$^{-1}$·min$^{-1}$ for a specified period. The method still further includes, after the specified period, flowing the liquid mixture through the membrane module under conditions such that the liquid mixture is separated into a permeate and a retentate. Embodiment 2 is the method of embodiment 1, further including, during the specified period, increasing a temperature of the circulating liquid mixture at a temperature ramp range of 2 to 25° C./min. Embodiment 3 is the method of either of embodiments 1 or 2, wherein the membrane module includes one or more of the membranes in the form of membrane tubes, and the method further includes, during the specified period, adjusting pressure drop between inlet and outlet tapping points of the membrane module containing one or more of the membranes in form of membrane tubes at a pressure drop ramp rate of 1 to 4 bar/hr increase per membrane tube. Embodiment 4 is the method of embodiment 3, wherein the flow rate ramp, the temperature ramp, and/or the pressure drop ramp are determined by a machine learning algorithm, an artificial intelligence algorithm, and/or neural network modeling. Embodiment 5 is the method of any of embodiments 1 to 4, wherein the specified period is in a range of 1 to 1.5 hours. Embodiment 6 is the method of any of embodiments 1 to 5, wherein the membrane is adapted to perform a separation process is selected from the group consisting of pervaporation, vapor permeation, ultrafiltration, nanofiltration, reverse osmosis, and combinations thereof. Embodiment 7 is the method of any of embodiments 1 to 6, further including determining, during the specified period, optimal conditions for separating the liquid mixture. Embodiment 8 is the method of embodiment 7, wherein the optimal conditions for separating the liquid mixture are determined by a machine learning algorithm, an artificial intelligence algorithm, and/or neural network modeling. Embodiment 9 is the method of either of embodiments 7 or 8, wherein the optimal conditions include a temperature of the liquid mixture in a range of 100 to 200° C. and an operating pressure of 2 to 8 bar. Embodiment 10 is the method of any of embodiments 7 to 9, wherein the optimal conditions include an optimal flow rate of 80 to 1000 L/hr per membrane module. Embodiment 11 is the method of any of embodiments 1 to 10, wherein the conditions in the flowing step include applying vacuum to the membrane at a vacuum pressure of 20 to 500 mbar with ramp rate of 20 to 100 mbar per minute. Embodiment 12 is the method of any of embodiments 1 to 11, wherein the liquid mixture contains 2-90 wt. % diol and 10-98 wt. % water. Embodiment 13 is the method of any of embodiments 1 to 11, wherein the method is applied to the processes selected from the group consisting of BPA and/or Phenol Dehydration, tetrahydrofuran (THF)-methanol-water separation, Acetic Acid-HCl-water separation, Toluene Dehydration, dimethylcarbonate (DMC)-Methanol separation, Methanol-Toluene-water separation, alcohol-water dehydration, monoethylene glycol dehydration. Embodiment 14 is the method of any of embodiments 1 to 11, wherein the liquid mixture is a mixture of monoethylene glycol and water, and the permeate contains at least 95 wt. % water. Embodiment 15 is the method of any of embodiments 1 to 14, wherein the membrane includes a polymeric membrane, a ceramic membrane, a zeolite membrane, a hybrid membrane, or combinations thereof, and the membrane is in a module configuration including plate and frame, tubular, hollow fiber, or combinations thereof.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method of separating components of a liquid mixture, the method comprising:
a) dynamically soaking one or more membranes of a membrane module, the dynamically soaking comprising:
circulating the liquid mixture through the one or more membranes of the membrane module, and
increasing circulating flow rate through the membrane module at a flow rate ramp range of 5 to 100 $L \cdot hr^{-1} \cdot min^{-1}$ for a specified period of 1 to 1.5 hours; and
b) after the specified period, flowing the liquid mixture through the one or more membranes of the membrane module under conditions such that the liquid mixture is separated into a permeate and a retentate;
wherein the liquid mixture comprises 2-90 wt. % diol and 10-98 wt. % water.

2. The method of claim 1, further comprising, during the specified period, increasing a temperature of the circulating liquid mixture at a temperature ramp range of 2 to 25° C./min.

3. The method of claim 1, wherein the membrane module comprises a ceramic membrane.

4. The method of claim 3, wherein the flow rate ramp, the temperature ramp, and/or the pressure drop ramp are determined by a machine learning algorithm, an artificial intelligence algorithm, and/or neural network modeling.

5. The method of claim 1, wherein the membrane is adapted to perform a separation process is selected from the group consisting of pervaporation, vapor permeation, ultrafiltration, nanofiltration, reverse osmosis, and combinations thereof.

6. The method of claim 1, wherein the conditions in the flowing step include applying vacuum to the membrane at a vacuum pressure of 20 to 500 mbar with ramp rate of 20 to 100 mbar per minute.

7. The method of claim 1, wherein the liquid mixture comprises 2 wt. % diol and 98 wt. % water.

8. The method of claim 1, wherein the method is applied to the processes selected from the group consisting of BPA and/or Phenol Dehydration, THF-methanol-water separation, Acetic Acid-HCl-water separation, Toluene Dehydration, DMC-Methanol separation, Methanol-Toluene-water separation, alcohol-water dehydration, monoethylene glycol dehydration.

9. The method of claim 1, wherein the liquid mixture is a mixture of monoethylene glycol and water, and the permeate comprises at least 95 wt. % water.

10. The method of claim 1, wherein the membrane includes a ceramic membrane, a zeolite membrane, a hybrid membrane, or combinations thereof.

11. The method of claim 9, wherein the membrane includes a ceramic membrane, a zeolite membrane, a hybrid membrane, or combinations thereof.

12. The method of claim 4, wherein the membrane includes a ceramic membrane, a zeolite membrane, a hybrid membrane, or combinations thereof.

13. The method of claim 1, wherein the membrane includes a ceramic membrane, a zeolite membrane, a hybrid membrane, or combinations thereof.

14. The method of claim 5, wherein the membrane includes a ceramic membrane, a zeolite membrane, a hybrid membrane, or combinations thereof.

\* \* \* \* \*